United States Patent Office 3,256,527
Patented June 14, 1966

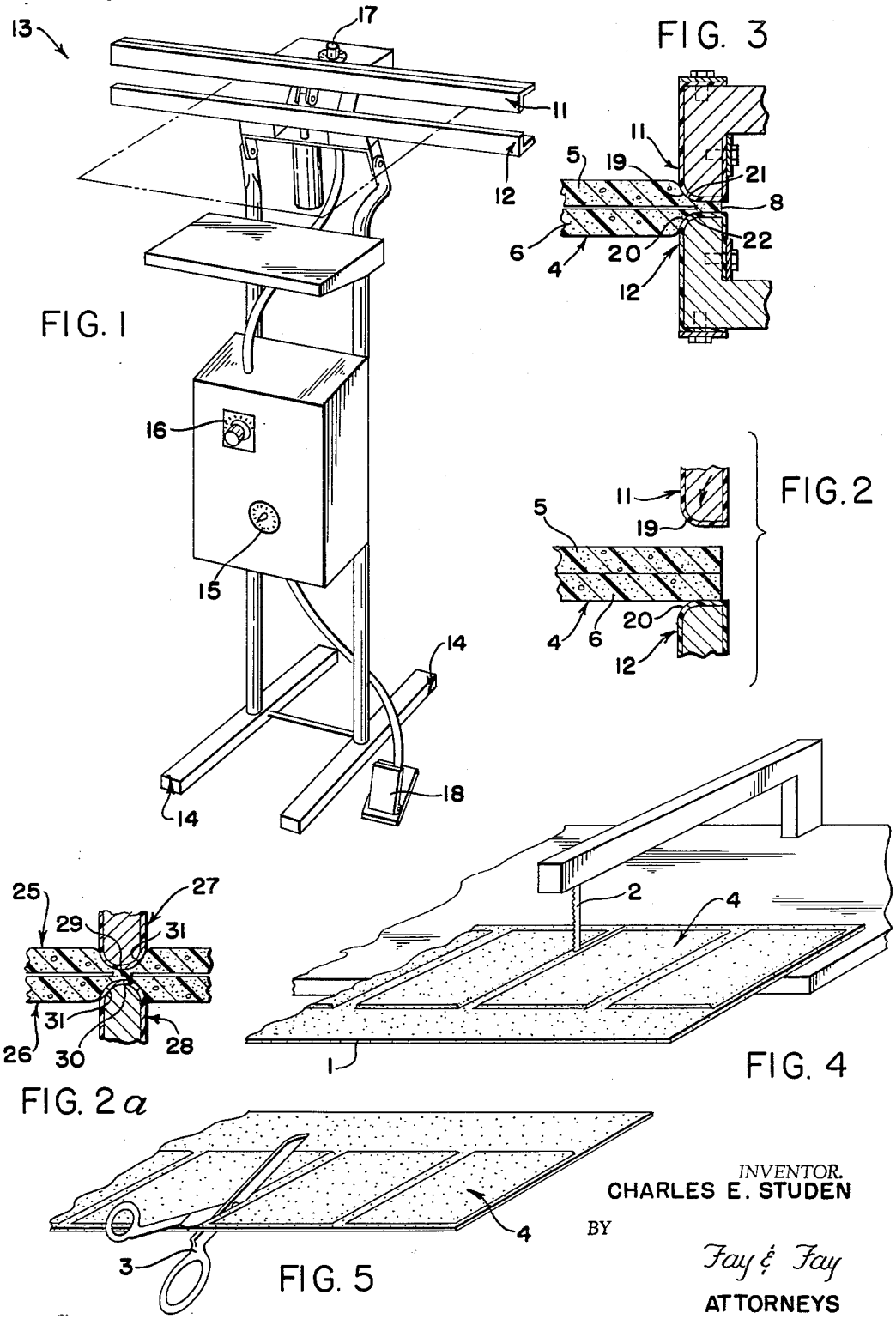
June 14, 1966 — C. E. STUDEN — 3,256,527
EXPANDED PLASTIC ENVELOPE
Filed April 6, 1964 — 2 Sheets-Sheet 1
INVENTOR.
CHARLES E. STUDEN
BY
Fay & Fay
ATTORNEYS June 14, 1966   C. E. STUDEN   3,256,527
EXPANDED PLASTIC ENVELOPE
Filed April 6, 1964   2 Sheets-Sheet 2
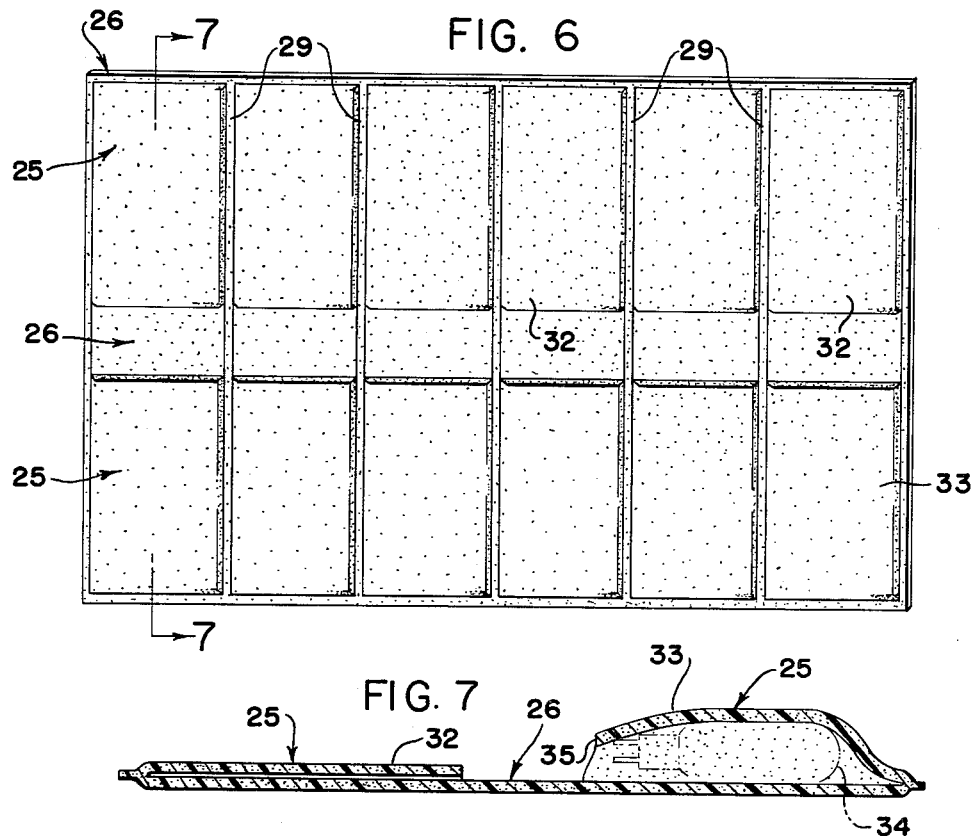
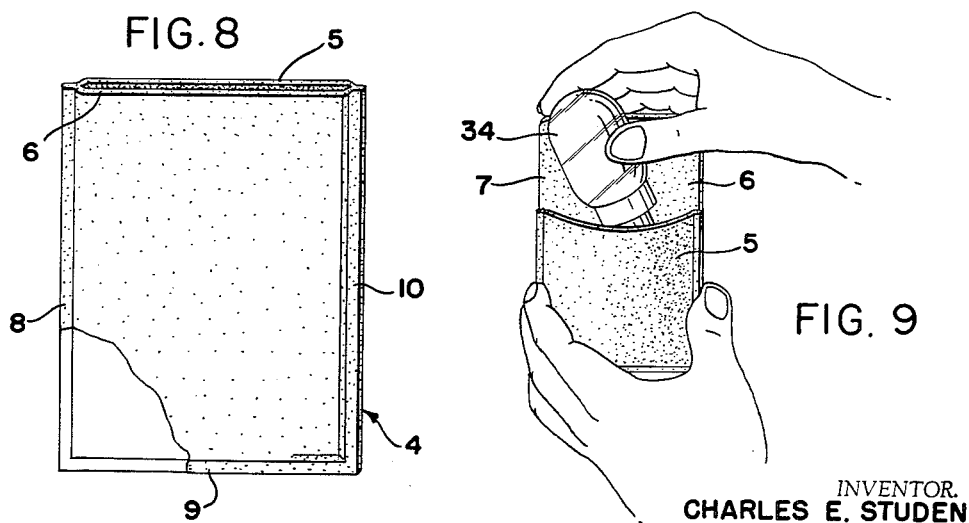
INVENTOR.
CHARLES E. STUDEN
BY
Fay & Fay
ATTORNEYS

3,256,527
EXPANDED PLASTIC ENVELOPE
Charles E. Studen, R.D. 1, Pekin Road, Newbury, Ohio
Filed Apr. 6, 1964, Ser. No. 357,702
6 Claims. (Cl. 229—68)

This invention concerns an improved expanded plastic envelope for packaging which may be utilized in a number of specific applications such as the electronic, glass or shipping industry.

In the broadest sense, an improved expanded plastic envelope of this invention consists of a plurality of expanded plastic side members, with at least one bonded seam therebetween and a partially fused adjacent zone merged into the seam by a filleted portion.

More specifically, this invention provides for an expanded plastic envelope of expanded polyethylene, expanded polyurethane or expanded polystyrene. It must also be realized that the aforementioned materials may be covered with at least one layer of paper material in order to produce an envelope with greater resistance to puncturing.

It must further be realized that an expanded plastic envelope of the immediate invention may have a plurality of compartments defined by bonded seams in order to receive a number of components. In addition, these plastic envelopes of the immediate invention may have an expanded plastic covering flap as an integral projection from one of the side members of the envelope.

A suitable heat-sealing apparatus for manufacturing an expanded envelope comprises a time, temperature and pressure control, an actuator, and opposed jaws having nonsymmetrical rounded outer edges and covered with polytetrafluoroethylene. These jaws are adapted to receive at least two layers of expanded plastic and to apply a predetermined heat and pressure thereto through a predetermined time, from one side of a seam to the other. It must further be realized that the jaws may have a rounded edge on either the inner or outer side and covered with polytetrafluoroethylene in order to produce a seam in the middle of an expanded plastic envelope having a plurality of compartments.

The expanded plastic envelope of this invention may be manufactured by cutting an expanded blank to size, folding the blank to form a plurality of sides, bonding the sides by a heat-sealing process having a specified time, temperature and pressure cycle to form at least one seam under decreasing pressure from one side of an elongated area defining the seam to the other. It must be further realized that this process could include the steps of cutting a plurality of expanded plastic blanks to a predetermined size, positioning these blanks one over another, joining the side members and other predetermined portions by a heat-sealing operation, which is performed at a specified time, temperature and pressure.

In general, the advantages of the improved plastic envelope of the immediate invention include a reusable cushioned package having protection against shock and impact during storage and transportation. These expanded plastic envelopes are used to package electrical appliances, cushion and seal-in electronic products, such as meters, printed circuits and gauges, packaging on glasses and ceramics, packaging optical units and delicate and sensitive instruments.

The prior art of the aforementioned packaging industries has used materials which have certain limitations, since they must meet the specific requirements of a cushioning material. In general, this art has shown the use of flaked paper, sawdust, blocked styrofoam and a number of further packaging materials. These prior art devices have also lacked the resiliency and abrasive resistance so necessary in the packaging industry. Furthermore, the envelope of the immediate invention provides these favorable properties and in addition yields an envelope of a closed cellular material, which is imperviable to dust, water, moisture, water vapor, acid and alkyl and deterioration. Further advantages lie in the fact that this material is buoyant, odorless, nontoxic, tough and will not absorb liquids. Thus, it is seen that this envelope is easily adaptable to the electronic, glass and shipping industry for fragile materials.

With the problems of the prior art devices in mind, it is the general object to provide an envelope consisting of a plurality of expanded plastic side members having a partially fused adjacent zone merged into the seam by a fillet.

A further object of the invention is to provide a reusable cushioning package which will protect various articles against abrasion, shock and impact during transportation and storage.

It is a more specific object of the invention to provide an expanded plastic envelope in which the expanded plastic is expanded polyethylene, expanded polyurethane or expanded polystyrene.

It is still another object to provide a plastic envelope in which the aforementioned expanded plastic is covered with at least one layer of paper to produce an envelope which is relatively impervious to puncturing while retaining its soft inner properties.

It is yet another object to provide an expanded plastic envelope having a covering flap integral with the side members in order to permit a simplified mode of sealing the top and prohibiting the article packaged from dropping out of the envelope.

It is a further object of this invention to provide a heat-sealing apparatus for manufacturing an expanded plastic envelope comprising a support, a time control, a temperature control and a pressure control, an actuator and opposing jaws having nonsymmetrically rounded outer edges and covered with polytetrafluoroethylene adapted to receive at least two layers of expanded plastic and to apply a predetermined heat and pressure thereto by decreasing amounts from one side of an elongated area defining a seam to the other.

It is yet a further object of this invention to provide a method of manufacturing an expanded plastic envelope comprising the steps of cutting an expanded plastic blank to size, folding the blank to form a plurality of sides, bonding the sides by heat-sealing to form at least one seam, under decreasing pressure from one side of an elongated area defining the seam to the other.

It is yet a further object of this invention to provide a method of manufacturing an expanded plastic envelope comprising the steps of cutting at least one expanded plastic blank to a predetermined size, positioning the blanks one over the other and joining the side members by heat-sealing at a specified time, temperature and pressure, a majority of the periphery of said side members.

Other and more specific objects of the invention will be apparent from the detailed description to follow.

In the drawings:

FIG. 1 is a front perspective view of a heat-sealing apparatus.

FIG. 2 is a side view of a pair of opposed jaws in the open position of a shape as taught by this invention.

FIG. 2a is a side view of a pair of opposed jaws or a further embodiment of this invention in a closed position.

FIG. 3 is a cross-sectional view of the jaws in FIG. 2 in a closed position.

FIG. 4 is a perspective view of a saw cutting expanded plastic blanks.

FIG. 5 is a perspective view of a pair of scissors cutting expanded polyethylene blanks and an expanded plastic blank.

FIG. 6 is a top view of an expanded plastic envelope having a plurality of compartments.

FIG. 7 is a sectional view along line 7—7 of FIG. 6, showing the expanded plastic envelope having a plurality of compartments with one of the compartments filled.

FIG. 8 is a front view of an expanded plastic envelope having a single compartment, with a corner thereof illustrating an embodiment having a paper covering, and FIG. 9 is a front view of an expanded plastic envelope and an electronic tube indicating the manner in which a tube is inserted and the position of an integral flap member.

In the embodiment illustrated, an expanded plastic envelope is manufactured by cutting an expanded plastic blank 1 having a variable thickness depending on the specific application of the finished envelope, by any cutting means, such as a conventional saw 2 or scissors 3. In this cutting operation, the blank 1 is cut into the shape as described by the specific application and if flaps are required they will be provided for in this cutting operation. After cutting out the expanded plastic blank 4, the blank 4 is doubled over to form side members 5 and 6 (FIG. 8). If a flap portion 7 is required, side members 5 and 6 will be folded so that the flap member 7 extends from the top of the envelope as shown in FIG. 9. The edges 8, 9 or 10 are inserted between the jaws 11 and 12 of FIG. 2 of heat-sealing apparatus 13. This heat-sealing apparatus 13 is comprised of a pair of supporting legs 14, a time controller 15, a pressure controller 16, a temperature controller 17 and an actuator 18.

This apparatus operates in the following manner. When the jaws 11 and 12 are required to come together with a certain pressure and temperature for a specific time, the required time, temperature and pressure are set on their respective controls, 15, 16 and 17. The actuator pedal 18 is then depressed which actuates the time, pressure, temperature cycle; and as a result, the jaws are held together at the specific pressure and temperature for the preset time.

In order to eliminate sticking of the expanded plastic to the jaws of the heat-sealing apparatus, a coating of polytetrafluoroethylene is put on as a facing of the jaws 11 and 12 in the area which will contact the expanded plastic. The jaws 11 and 12 are shown in FIG. 3 and are formed having curved sections 19 and 20, which are covered with the polytetrafluoroethylene coating. It is to be understood that this polytetrafluoroethylene may be in the form of a tape, impregnating the surface, or any other such means in which it will eliminate sticking of the expanded plastic to the jaws when placed under temperature and pressure.

When these jaws 11 and 12 come together in the time, temperature and pressure cycle as set on the apparatus, the curved portions 19 and 20 will create fillets 21 and 22 on the edge 8 of the expanded plastic envelope 4. As these jaws 11 and 12 descend on their respective side members, they melt the expanded plastic and fuse it together at the flat horizontal position and simply fuse the outer layer of the fillets 21 and 22 to form a relatively hard, flexible layer of plastic.

Since it is well known that the fillets 21 and 22 will be areas of high stress concentration when the envelope is in use, it is realized that these areas must be areas having a higher strength than the rest of the envelope and have at least as much strength as the rest of the envelope. In order to properly gauge the strength of the envelope it is assumed that stress equals a force divided by the area in which the force is applied. The stress concentration factor $k$ is $S_{max}/S_a$ where $S_{max}$ equals the maximum stress created in the seam and $S_a$ is the nominal average stress as obtained by elementary stress analysis procedures. Since there is a reduction in area, the fillet 21 over which the force will be distributed, the material in this area must be of a higher tensile strength than that of the side members. Since this partially fused zone 21 adjacent to the bonded seam 8 has an external layer of fused plastic which has a higher tensile strength than the expanded plastic material of the side members, the stress concentration factor will be low and an envelope of relatively uniform strength properties will result when the jaws 11 and 12 are returned to the open position.

It has been found that the controlled variables for sealing the various expanded plastic envelopes depend on the fusing point of the expanded plastic used. As FIG. 3 shows, the material in contact with the parallel portions of the jaws 11 and 12 is actually fused together and is a coherent body of plastic whereby its expanded properties have been lost when it is fused into one seam 8. When each respective seam 8, 9 and 10 has been heat sealed by the aforementioned process, the peripheral seam of fused plastic about two sides and the bottom of the envelope 4 is completed, this peripheral edge will have fillet portions which are relatively strong.

A further embodiment of this invention is shown in FIG. 2a whereby two blanks 25 and 26 are placed between a pair of opposing jaws 27 and 28 which have curved portions on each side of their contact area which will produce a filleted portion on each side of the seam 29. It is to be understood that these jaws 27 and 28 have an external covering of polytetrafluoroethylene and the prescribed time, pressure and temperature cycle is performed. In the seam 29, area 30 is fused together while fillets 31 have a partially fused adjacent zone which is merged into the seam 29 by a fillet. By performing a series of these operations, the expanded plastic blanks 25 and 26, as shown in FIG. 6, may be fabricated in a manner which will produce a plurality of envelopes 32. If it is desired, another expanded plastic blank 33 may be cut out and joined to the lower blank 26 as previously described. Thus, an envelope will have a plurality of compartments and each compartment will contain a given article. It is to be understood that this operation to form the envelope of FIG. 6 could be performed by a single set of jaws which have the required lattice of jaws extending from their surface and exerting the time, temperature and pressure cycle to the blanks in one pass.

Since the expanded plastic is resilient, it may be stretched to accommodate an article, as shown in FIG. 7, and will hold the article 34 in tightly and its upper lip 35 will tend to contract to its original shape due to the elastic properties. In still another embodiment, it is seen that an article such as an electronic tube 34 could be inserted into the envelope of FIG. 9 and the flap turned over in order to completely insure that the article would stay within the confines of the envelope.

Since in some instances it is required to place at least one layer of paper around the exterior of the envelope, as partially shown in the lower left corner of the envelope of FIG. 8, usually this is done before the seams are heat sealed. In the specific use of expanded polystyrene, it is well known that polystyrene is rather easily punctured and open in some areas to the air due to its construction of large cells. Thus, when a paper is bonded to the exterior surface of the blank, a substantially impervious layer is realized with considerable resistance to puncture and the envelope is strengthened while still retaining the properties of a soft, expanded polystyrene on the inside of the container.

It is to be further realized that the time, temperature and pressure cycle may vary a point or two due to the properties of the specific material.

For ease of description the principles of the invention have been set forth in connection with but a single illustrated embodiment showing an improved expanded plastic envelope. It is not my intention that the illustrated embodiment, nor the terminology applied in describing it be limiting inasmuch as variations can be made without departing from the spirit of the invention. Rather, I

I claim:

1. An improved expanded plastic envelope consisting of a plurality of expanded plastic side members having at least one bonded seam therebetween with a structure having a marginal first zone with a cross section having a smooth collapsed cell construction which gradually merges into a second zone of partially closed cell construction with the outer cells of the cross section being glossy and collapsed and the inner cells being intact to provide a resilient center portion and a relatively harder and less resilient skin, said second zone defining a fillet between said first zone and said side members of expanded plastic having full sized cells.

2. An expanded plastic envelope of claim 1 in which the expanded plastic side members are of one piece.

3. An expanded plastic envelope of claim 1 in which the expanded plastic is selected from the group of
 (a) expanded polyethylene
 (b) expanded polyurethane, and
 (c) expanded polystyrene.

4. An expanded plastic envelope of claim 1 in which the expanded plastic is covered with at least one layer of paper material.

5. An expanded plastic envelope of claim 1 which has a plurality of compartments defined by bonded seams.

6. An expanded plastic envelope constructed in accordance with claim 1 with at least one of said expanded plastic side members having a covering flap portion as an integral projection thereon.

References Cited by the Examiner

UNITED STATES PATENTS

| | | | |
|---|---|---|---|
| 2,087,444 | 7/1937 | Potdevin | 93—8 |
| 2,237,327 | 4/1941 | Bell | 93—8 |
| 2,620,842 | 12/1952 | Hoeppner et al. | 150—7 |
| 2,709,467 | 5/1955 | Hoeppner | 150—7 |
| 2,737,503 | 3/1956 | Sprague et al. | |
| 2,767,756 | 10/1956 | Niles. | |
| 2,873,566 | 2/1959 | Sylvester. | |
| 2,888,407 | 5/1959 | Cooper et al. | |
| 2,917,217 | 12/1959 | Sisson | 229—3.5 X |
| 2,962,158 | 11/1960 | Struthers | 206—46 |
| 3,071,819 | 1/1963 | Harrison. | |

JOSEPH R. LECLAIR, *Primary Examiner.*

D. M. BOCKENEK, *Assistant Examiner.*

FRANKLIN T. GARRETT, *Examiner.*